(12) United States Patent
Jenkins

(10) Patent No.: US 6,348,149 B1
(45) Date of Patent: Feb. 19, 2002

(54) MANUFACTURE FOR FILTERING OIL

(76) Inventor: Dan Jenkins, 34708 Chelsea La., Palmdale, CA (US) 93550

( * ) Notice: Subject to any disclaimer, the term of this patent is extended or adjusted under 35 U.S.C. 154(b) by 0 days.

(21) Appl. No.: 09/545,161

(22) Filed: Apr. 7, 2000

Related U.S. Application Data

(62) Division of application No. 08/826,437, filed on Mar. 18, 1997, now Pat. No. 6,048,454.

(51) Int. Cl.7 .......................... B01D 35/027; B01D 35/26
(52) U.S. Cl. .................... 210/172; 210/232; 210/416.5; 210/436; 210/443; 210/472
(58) Field of Search ................................. 210/168, 172, 210/416.5, 436, 472, 443, 232; 123/196 A; 184/6.13, 6.24, 6.28

(56) References Cited

U.S. PATENT DOCUMENTS 2,302,489 A * 11/1942 Brown ......................... 210/436
4,151,823 A * 5/1979 Gross et al. ............. 123/196 A

* cited by examiner

Primary Examiner—Matthew O. Savage
(74) Attorney, Agent, or Firm—Frank L. Zugelter

(57) ABSTRACT

An oil exchange apparatus (16, 96, 126) and its assembly with an arrangement (17) of fluid flow lines (112), (108), for lubricating a system, such as an engine (15, 145), while providing for a quick exchange of the apparatus (16, 96, 126) with another one when another batch of oil is to lubricate the system. A filter (30, 103, 135) is mounted and disposed in a receptacle (21, 97, 128); inlet conduits (44, 109, 132) and outlet conduits (34, 105, 136) are mounted to the receptacle (21, 97, 128) and by which oil flows in and out of it in the operation of the system. A vacuum or vent conduit 43 also is mounted to the receptacle in each of its embodiments. In one embodiment, all the conduits (34, 44, 43) are mounted in a top housing component (22) of the receptacle (21). In other embodiments, inlet (109, 132) and outlet (105, 136) conduits are mounted at the receptacle's bottom (101, 130), while the vacuum/vent or third conduit (115, 141, 156) is at its top (102, 142). A pump (127) is disposed in the receptacle (128) in the one embodiment. In the assembly of apparata (16, 96, 126) and lines (112, 108 and 117, 141, 156), quick-disconnects (107), (111), (155) and (138), (137), (143) provide the connection between corresponding apparatus and lines, while the lines at their other ends are connectable to the housing (145) of the system's engine. A pump (157) is mounted in the return line (108) in one embodiment, and a pump (161) is mounted across both the return line (112) and the flow line (108) to the apparatus in another embodiment.

4 Claims, 6 Drawing Sheets

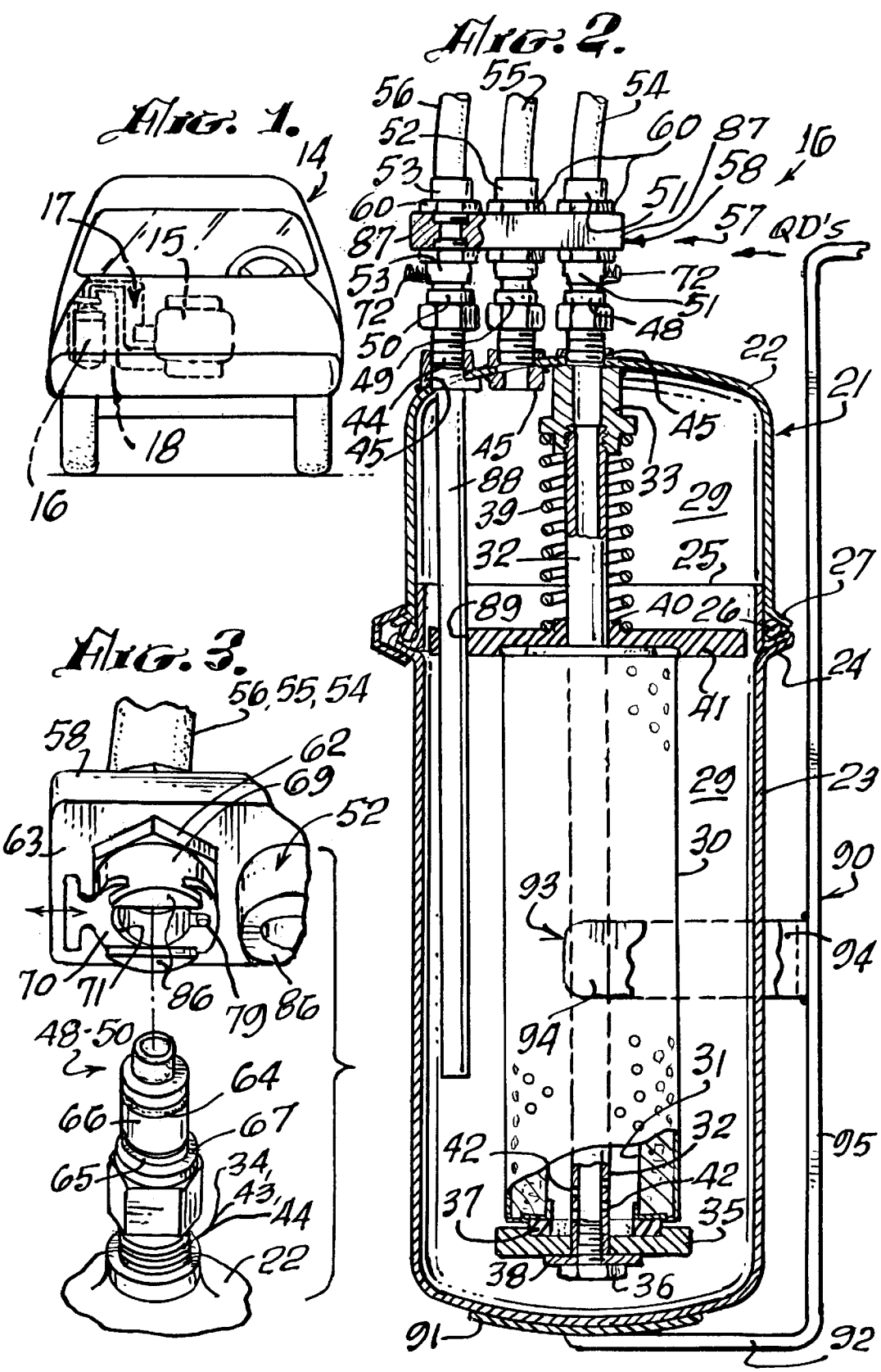

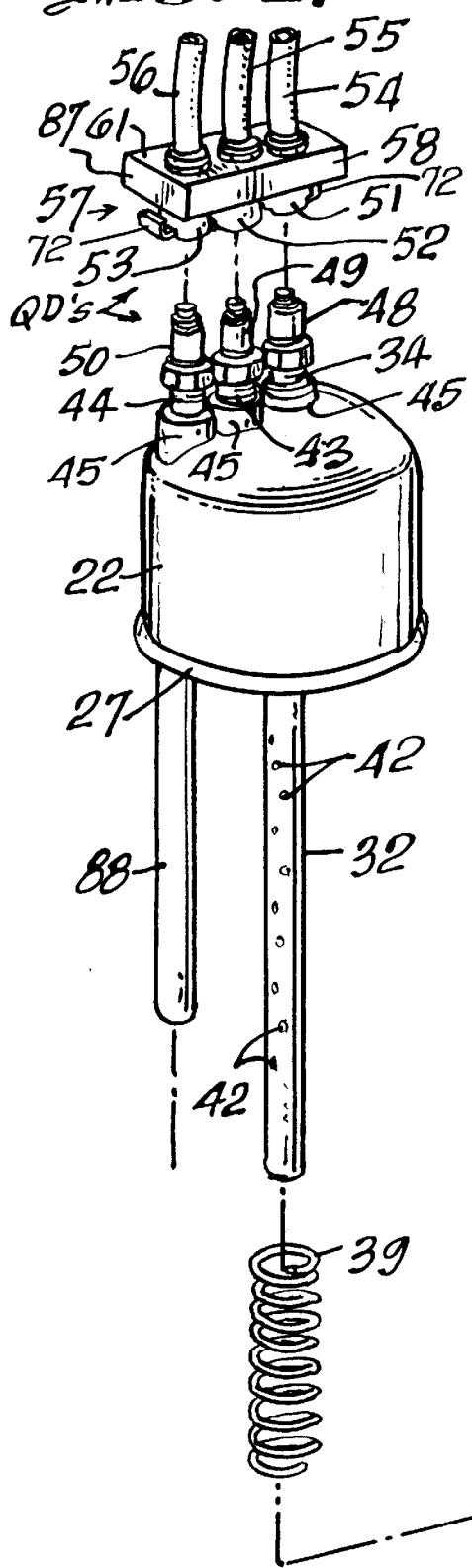
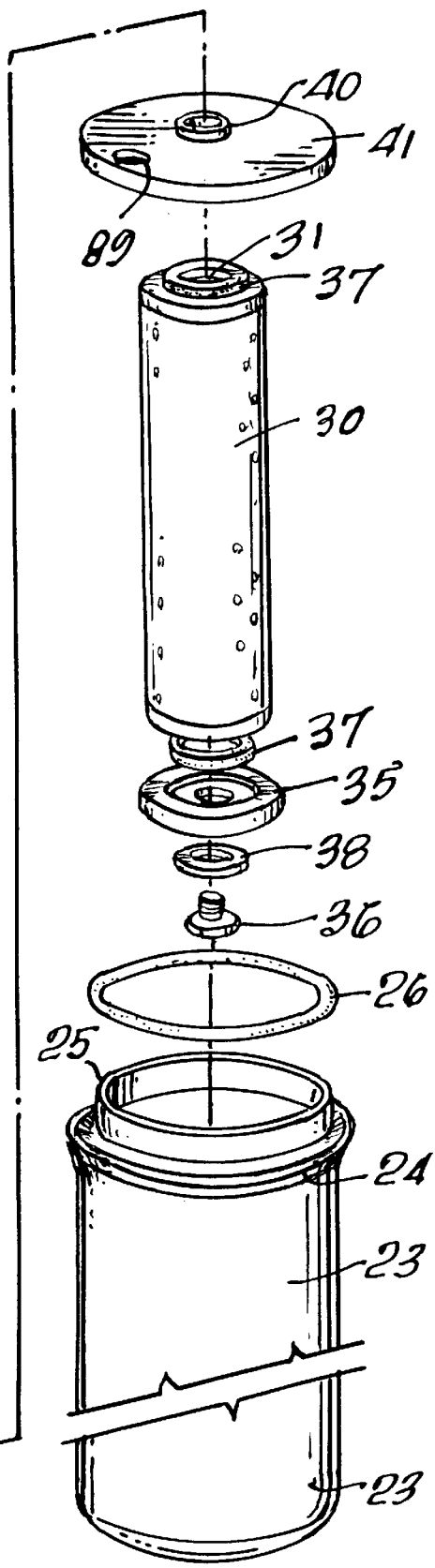
FIG. 4.

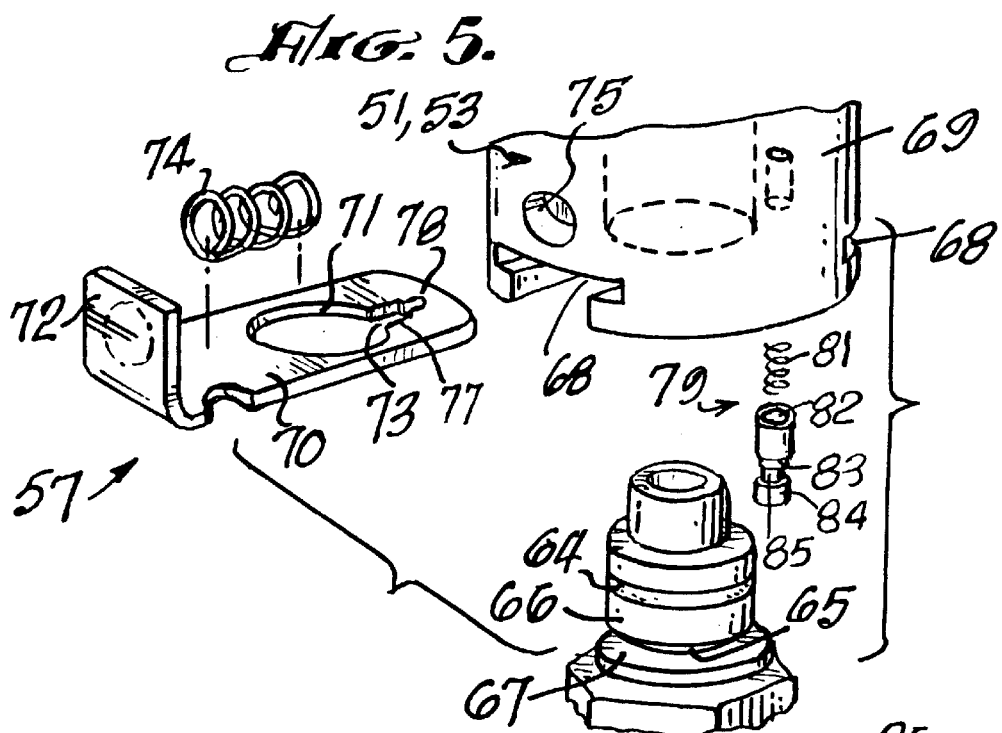
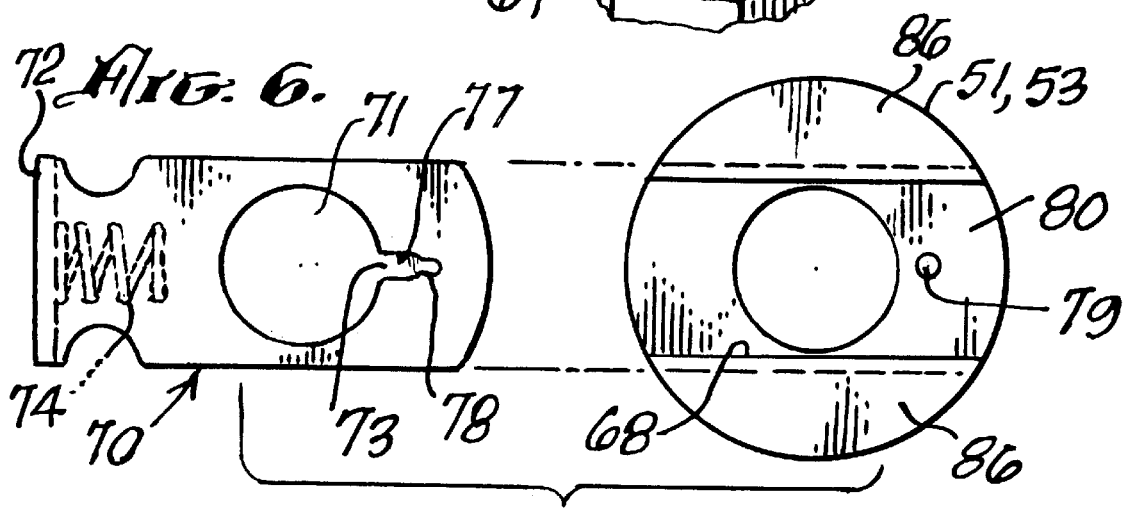
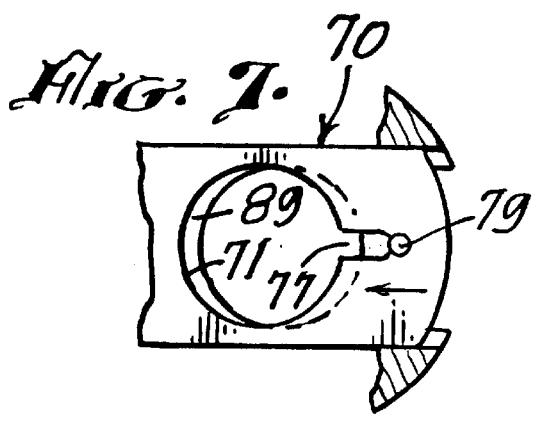
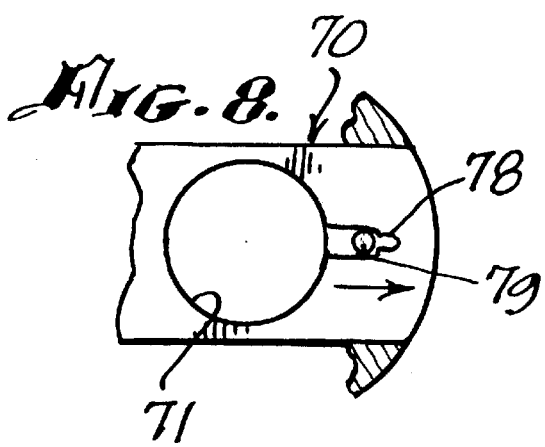

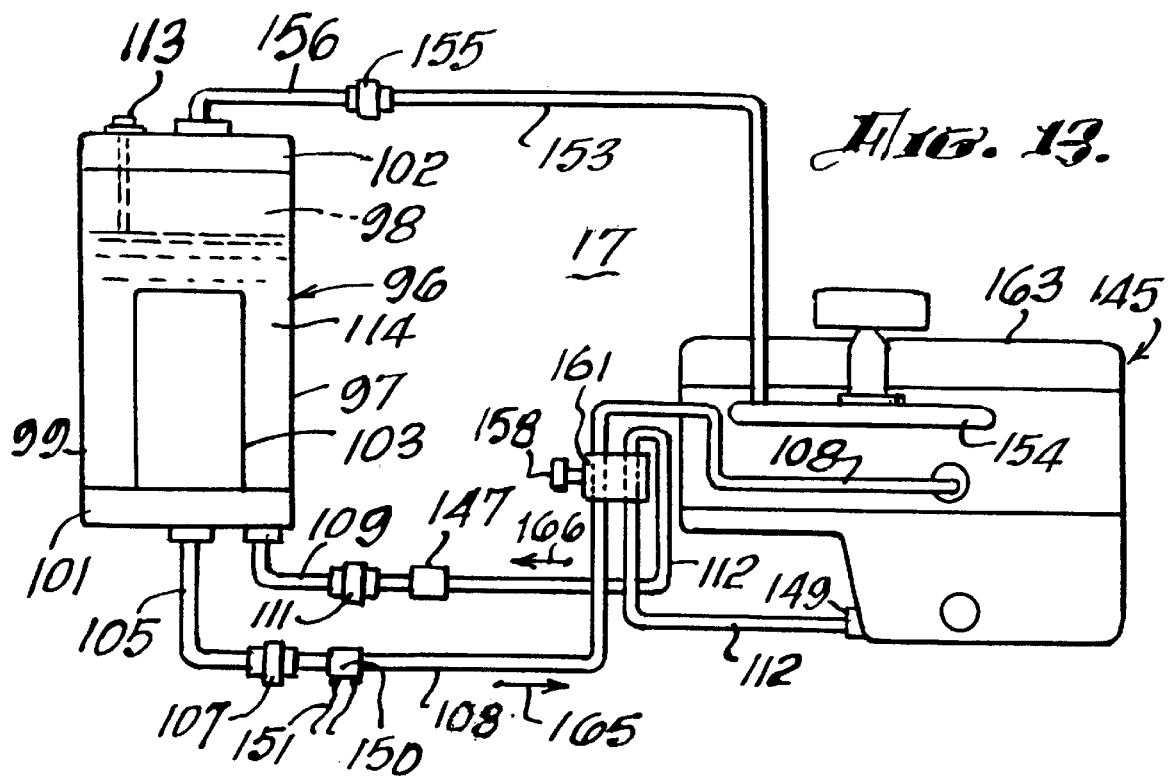
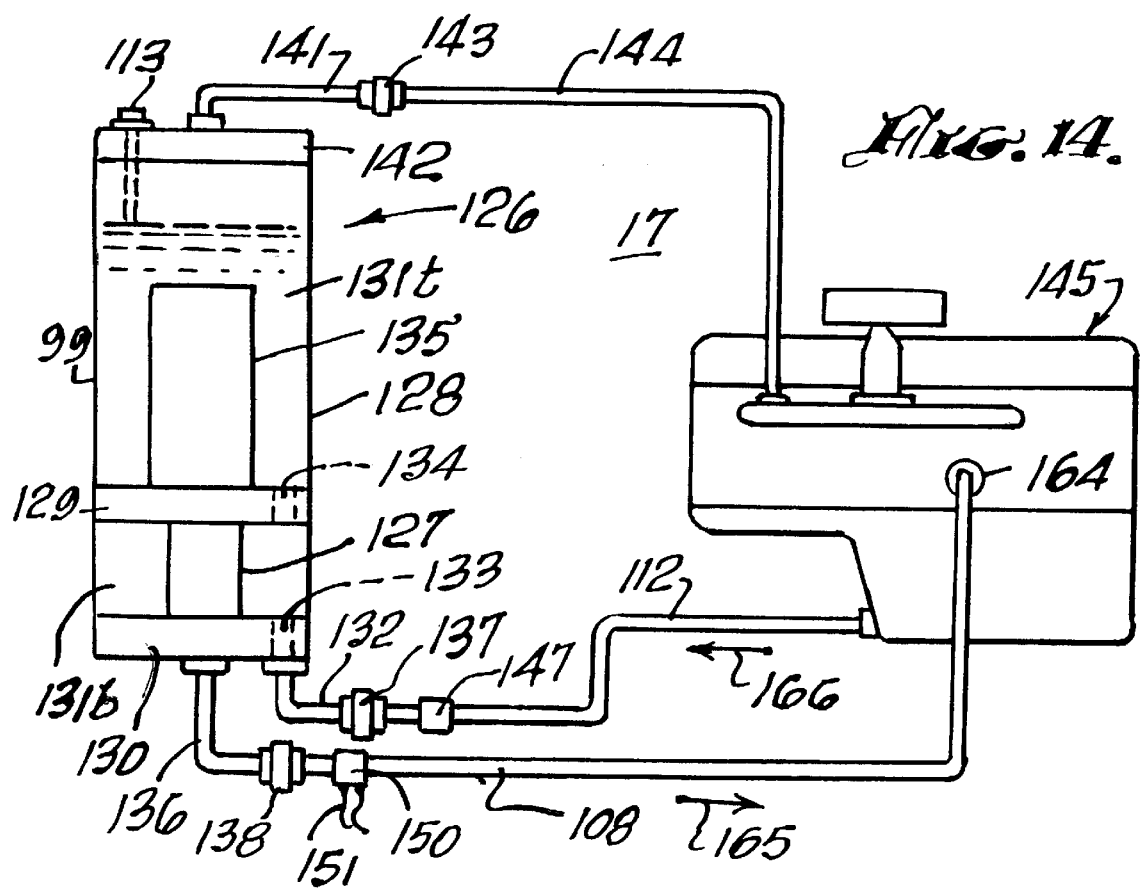

MANUFACTURE FOR FILTERING OIL

This application is a divisional application of U.S. appln Ser. No. 08/826,437, filed Mar. 18, 1997, now U.S. Pat. No. 6,048,454, granted Apr. 11, 2000 A.D.

TECHNICAL FIELD

This invention is directed to an apparatus and an assembly of lines including the apparatus which provide for lubrication of moving parts in a system requiring lubrication, and further by which the used lubricating liquid is returnable to the apparatus in such assembly, for reclamation, re-cycling, or environmental disposal.

BACKGROUND IN THE ART

The U.S. Pat. No. 4,075,099, granted Feb. 21, 1978, to Pelton et al, discloses a container that collects used oil from an internal combustion engine. The Pelton et al patented invention itself is directed to a specially designed adaptor through which the oil flows in both directions, to and from the container to and from the engine, without a disclosure of an assembly of lines including the container except for a diagrammatic scheme showing connection of his container to an internal combustion engine in a general manner. Other prior art teachings, such as U.S. Pat. Nos. 3,211,256; 4,869, 346; 4,884,660; 4,909,205; 5,074,379; 5,130,014; and 5,148,844, disclose apparata utilized in the flow of oil in lubricating systems.

SUMMARY OF THE INVENTION

This invention is directed to an apparatus and its arrangement in and with an assembly of lines, which provides for conveyance of lubricating liquid to and from a system requiring lubrication in its operation, and substitution of another like apparatus in such assembly upon exhaustion of the life of a lubricating liquid or when the need to replace it is reached. The liquid or oil is returned to the apparatus, after which it may be reclaimed, recycled, or disposed of, particularly today in accordance with the environmental attitude towards Mother Earth, while substituting another like apparatus with a supply of fresh or filtered (cleaned) lubricating liquid into the assembly to continue to lubricate the system.

More particular, the inventive concept lies in an apparatus and its improvement, for containing a quantity of useful oil and which is readily and conveniently connectable and removable to quick-disconnect members or couplers, the latter associated with both the apparatus and in an arrangement with an assembly of lines operably connected to a system requiring lubrication. Examples of such a system requiring lubrication are internal combustion, diesel and stationary engines. This invention provides for flow of oil for a system and between the apparatus and its connection to the arrangement of such assembly of lines and their associated quick-disconnect members, and by which the oil is filtered in the apparatus and then returned to the system, except at a point in time when the life of the oil of the system is exhausted or there is a need to change the oil. Such used oil is returned or conveyed through one of the lines into the apparatus which then is conveniently, quietly, and quickly removed from such arrangement and the assembly. Another apparatus or "oil pack", with fresh oil therein, then is quickly, quietly and readily installed by connecting it, through the associated quick-disconnect members, to the assembly of lines that interface with or otherwise are arranged with the oil pack. Operation of the engine system then follows in a usual fashion.

More particular, a closed container includes a smaller-sized oil filter therewithin, three (3) conduits securely mounted to the container, two of which communicate with the interior of the container, and the third communicating with the filter within the container and by which filtered oil is returned to the system. While a vacuum is applied to or a vent is provided for the container's interior through one of its conduits from one line from the engine system, another conduit feeds from another line connected to the engine's system the unfiltered oil into the container. The third or last conduit returns through a third line connected to the engine's system filtered oil from the filter disposed and securely mounted in the container, to lubricate the system. The inventive concept provides for these three lines to be operatively connected to the three conduits of the apparatus, this being accomplished by means of the quick-disconnect members by which a ready removability and installation of the apparatus and/or improvement to the lines or their arrangement of such lines is achieved.

The lubricated system to which the apparatus, conduits, and lines is employed may take the form of an internal combustion engine in a vehicle, in one mode of operation of the invention.

An alternative embodiment includes an oil pump exteriorly mounted to the lubricated system rather than it being integrated within the lubricated system, as is done in or with conventional internal combustion engines.

Another embodiment provides for the oil pump to be disposed separately from the engine and operated by a belt connected to a motive power source, such as the engine's shaft.

Again, another embodiment provides for two of the lines to be operatively connected to an exteriorly mounted pump to the engine.

And again, another embodiment provides for the incorporation of the pump within the apparatus or its improvement itself.

An object of this invention is to provide a novel oil apparatus or oil pack by which used oil is replaced in a lubricated system by fresh oil in a like assembled oil pack, without the need for conventional draining of the used oil from the system.

Another object of the invention is to provide for a novel assembly of lines in the lubricated system which are operatively connected to the oil pack.

A further object of this invention is to provide an efficient assembly of oil pack and assembly of lines for a system to be lubricated by oil filtered through the oil pack.

A still further object of the invention is to provide an environmentally-sound oil-changing procedure to a lubricated system.

Another object of this invention is to eliminate careless discard of an oil filter and its used oil, which discard in numerous occasions in today's environmental setting substantially contributes to pollution of the environment.

A still further object of this invention is to provide an environmentally safe process by which used oil is disposed without polluting the environment.

Another object of the invention is to initiate the recycling of reclaimable used oil at the time of changing the oil in a lubricated system.

Another object of this invention is to provide a simple, expedient, and relatively clean procedure to change the oil in an internal combustion or other engine or system when the life of its oil has been exhausted, or needed to be changed.

These and other objects and advantages of the invention will become more apparent upon a complete and full reading of the following description, its appended claims and the accompanying drawing comprising five (5) sheets of fourteen (14) FIGURES.

BRIEF DESCRIPTION OF THE DRAWING

FIG. 1 is a diagrammatic frontal elevation of a vehicle in which subject matter of the invention is shown in dashed lines.

FIG. 2 is a cross-sectional view of a filter apparatus of the present invention.

FIG. 3 is an exploded fragmentary view of a lock mechanism for quick-connect members utilized in the invention on the apparatus.

FIG. 4 is an exploded perspective view of the apparatus illustrated in FIG. 2 and the lock mechanism illustrated in FIGS. 3, 5–8.

FIG. 5 is an enlarged perspective exploded view of a locking mechanism for one or a plurality of quick-disconnect members.

FIG. 6 is a bottom view of FIG. 5.

FIG. 7 is a fragmentary plan view of one part of the locking mechanism of FIG. 5, the part being in one position relative to a stop pin.

FIG. 8 is a fragmentary plan view of the part shown in FIG. 7 in another position relative to the same stop pin.

FIG. 13 is a schematic view of an oil pack and its arrangement with an assembly of lines of still another embodiment of the invention and by which a system requiring lubrication is lubricated.

FIG. 14 is a schematic view of one more embodiment of an oil pack and its arrangement with an assembly of lines of the invention and by which a system requiring lubrication is lubricated.

PREFERRED MODE OF CARRYING OUT THE INVENTION

Figure 10:
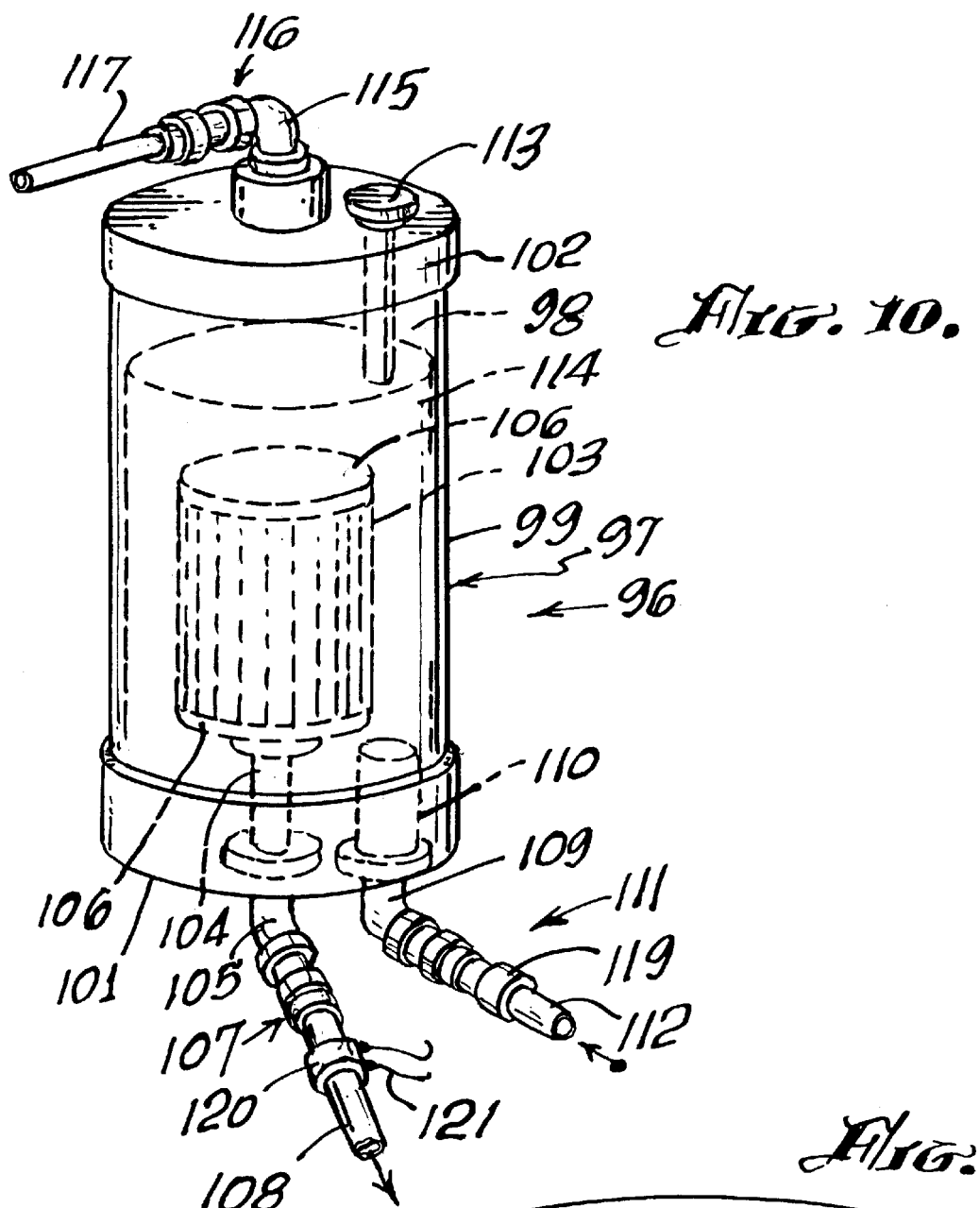
FIG. 10 is a perspective view of another embodiment of the invention.
Figure 9:
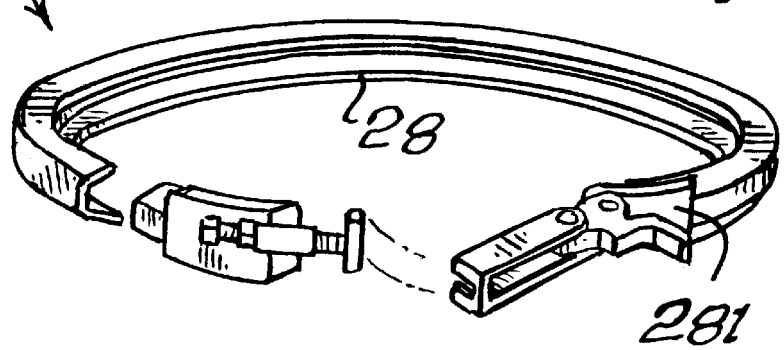
FIG. 9 is a perspective view of a Mormon (prior art) clamp that is utilized in the illustrated FIG. 2 embodiment.

Referring now to the drawing in which reference characters correspond to like numerals hereinafter, FIG. 1 illustrates a vehicle 14 having as an example of a lubricated system employed in the operation of the invention an internal combustion engine 15. The invention is directed to an oil pack or apparatus 16, embodiments thereof and, in arrangement with an assembly 17 of lines operatively connecting the oil pack 16 to corresponding systems for their lubrication. An oil pack 16 with the assembly 17 of lines is shown generally in dashed lines in FIG. 1, and is more fully described and illustrated hereinafter in reference to a number of embodiments of the invention. The oil pack 16 and assembly 17 of lines are usually located and suitably mounted within the confines or voids within an engine compartment 18 of vehicle 14, or of a trunk or other location. Embodiments of a manufacture or oil pack 16 containing oil, and which are utilized in and with such assembly 17 of lines, are illustrated in FIGS. 2–14, while FIGS. 11–14 disclose arrangements of oil packs and assemblies of lines whereby oil is delivered for lubricating a system and it is returned to the "oil pack" itself, and whereby their corresponding oil packs are readily disconnected from the assemblies. Such disconnections facilitate the removal and installation of oil packs, fresh or otherwise reusable, to lubricate the illustrated and other systems in the operation of the invention.

In the FIGS. 2–9 embodiment, the manufacture or oil pack 16 includes an oil receptacle or cylinder 21, comprising hollow top and bottom housing components 22, 23, respectively, that mate together. The bottom housing component 23 includes an annular lip 24 distal from its terminus or rim 25 and on which a circumferential sealing gasket 26 seats. An annular lip 27 at the terminus for the top housing component 22 sets on the gasket 26 in mating of the two components, after which a (known) Mormon clamp 28, illustrated in FIG. 9 but not shown mounted in place in FIG. 2, clamps upon the mated lips 24, 27 of the components 22, 23, thereby producing an interiorly sealed chamber 29 for the receptacle 21 and in which a conventional oil filter 30, for filtering oil, is disposed. Description of the Mormon clamp 28 is omitted as it is a well known clamping device that is readily closed and opened by actuation of its lever 28*l*, FIG. 9, while clamping and unclamping the lips 24, 27 of the two-piece receptacle 21 on which it is mounted. The volumetric capacity of chamber 29 is capable of retaining all of the oil that is required in the lubrication of an engine 15, or other system, and with which engine or system the manufacture 16 cooperates in the operation of the engine or system.

The oil filter 30 includes a bore 31 that slidingly fits to a hollow rod 32, FIG. 2, the top end of which is threaded to a bored fitting 33 secured, such as by welding, to a central portion of the top housing component 22. The top housing component 22 includes an opening about which a threaded nipple 34, FIG. 4, is welded, the nipple 34 communicating with the bore of the fitting 33. An apertured base 35 supports the filter 30 on the rod 32 by means of a bolt 36 the stem of which projects into the opening at the bottom of the hollow rod 32 and threaded thereto. The oil filter 30 seats upon the base 35, and gaskets 37 at its top and bottom, with a washer 38 on rod 32 at its bottom, provide a sound seal for filter 30.

A coiled spring 39 maintains a firm disposition for the filter 30 on the base 35 by its compressed force arising out of its own disposition between its mount on hub 40 on an apertured plate 41 that baffles oil splash. Plate 41 is disposed and suitably mounted atop the filter 30 and between it and the bored fitting 33. The hollow rod 32 includes a plurality of spaced orifices 42 along, about, and throughout the lower or lowest portions of its wall for communicating with the oil filter 30. Oil flows from within chamber 29 and through the filter 30 to orifices 42 in rod 32, to maintain an oil flowing pattern in the oil pack and to the system requiring lubrication. The diameter of the apertured plate 41 is less than the internal diameter of the housing components 22, 23 and thereby provides full use of the chamber's volumetric dimension for a required amount of oil needed for lubricating engine 15 and for retaining virtually all oil from the engine's system wherever the oilpack is to be replaced.

Integrally included atop the upper housing component 22, FIG. 2, are two (2) more openings in which two (2) threaded nipples 43, 44 thereat are securely mounted in suitable manner; for example, in FIG. 4, on threaded cylindrical collars 45 welded to the top housing component 22. Self-sealing hollow male plugs 48, 49, 50, of conventional quick-disconnect couplings (hereinafter sometimes referred to as quick disconnects QD) are respectively threadedly attached to their corresponding nipples 34, 43, 44. Conventional self-sealing hollow female plugs, 51, 52, 53 FIGS. 2, 4 suitably attached, when placed in operation with male plugs 48, 49, 50 to their corresponding lines or hoses 54, 55, 56, are operatively connected to their corresponding male counterparts 48, 49, and 50 when the QD's are joined together. These quick-disconnects or units QD's are well known connecting components in the pneumatic, fluid, and automotive industries for connecting flow hoses or other tubes conveying flow of liquids. Both male and female plugs are self-sealing themselves, upon disengagement from one another, thus preventing spillage from any oil or liquid that otherwise would flow through and from them, as well as no cap being required for apparatus 21.

To provide ease of connection, disconnection, and locking of the three (3) quick-disconnects simultaneously to and from the receptacle 21, a mechanism 57, FIGS. 2–8, is fashioned upon the three (3) female plugs 54, 55, 56 and their respective lines or hoses, so that all three (3) lines can be connected to or dis-connected from the receptacle 21 together, and locking or un-locking same together concurrently. Further, the geometrical locations of the elements of the quick disconnect QD's in both the block 58 of mechanism 57 and on the top housing 22 prevent a wrong-way hook-up or connection of such lines to such housing, as will be pointed out in the description following hereafter.

The mechanism 57 takes the form of the solid block 58 having three (3) holes (not visible in the FIGURES) that are in linear alignment with one another. The three (3) female plugs 54, 55, 56 correspondingly project through these three (3) holes, to face connection with their corresponding counterparts, the male plugs 48, 49, 50. The female plugs are secured to block 58 by means of nuts 60, FIG. 2, that are threaded to lengths of the female plugs and tightened down onto the one (top) side wall 61 of block 58, FIG. 4, while hexagonal bosses 62, FIG. 3, integrally formed exteriorly on the female plugs, tighten against the other (bottom) side wall 63 of block 58. The hoses 54, 55, 56 are suitably tightly or securely mounted on the noted lengths of the female plugs.

Each male plug includes, FIG. 3, a sealing oil-ring 64 suitably mounted on, and a groove 65 formed in, the plug's stem 66 formed atop its shoulder 67 along its length, in conventional manner.

In each of the two (2) exteriorly disposed female plugs 51, 53, a T-slot 68 [only one is shown in FIGS. 3 and 5] is formed in opposing portions of their respective annular walls 69. A flat lock plate 70 having a hole 71 engagingly slides to-and-from in its T-slot 68 in each of the two (2) exteriorly disposed female plugs 51, 53 in block 58. Hole 71 is slightly oval in nature, its major axis along a line between an actuator or finger tab 72 formed at one end of lock plate 70 and a slot 73 formed in lock plate 70 along the line towards an end of the lock plate opposing the actuator. A spring 74 is suitably mounted in a short bore 75 in the exterior wall 69 of each female plug 51, 53 and extends to press upon actuator 72, thereby biasing lock plate 70 outwardly of its exterior wall 69. Slot 73 communicates with hole 71 and includes two (2) small formations 77, 78. A stop pin 79 [exploded in FIG. 5] seats in a bore (not visible) in the recessed rim 80, FIG. 6, of the female plugs 51, 53 and mounts on a spring 81 inserted in a pocket 82, FIG. 5, formed in the bottom of the pin 79. Pin 79 extends into slot 73, capable of engaging either of the smaller body formations 77, 78 as well as preventing escape of lock plate 70 from its T-slot 68 by action of the biasing spring 74 against actuator 72. The stop pin 79 is prevented from popping out of its bore (not visible) in recessed rim 80 by means of a slight annular ledge 83 therein being engaged by the smaller body formation 77.

Biased pin 79 further includes a head 84 formed above a short and thin stem 85. In the joining step of connection between the male and female plugs, head 84 depresses against its spring 81 as it strikes the shoulder 67 on its corresponding male plug 48, 50. Consequently, the smallest body formation 78 (of the formations 77, 78) of slot 73 snaps in against or to engage each stem 85, by reason of the biasing action of spring 74 sliding the lock plate 70 outwardly of its annular wall 69. This state occurs upon the joining of such plugs together, as recessed rims 80 of the female plugs 51, 53 seat on shoulders 67 of their corresponding male plugs 48, 50 while the body formations of holes 71 in the lock plates 70 enter the grooves 65 of their corresponding male plugs 48, 50 to lock male and female plugs together in a relationship for flow of liquid or oil through them.

Without the need for depressing the pair of opposing finger tabs 72 towards each other, when block 58 and its mechanism 57 is being utilized in this embodiment, the holes 71 in lock plates 70, in size and location, provide access to the bores of the female plugs by their corresponding corresponding counter part male plugs. Thus, simultaneous connection of the quick-disconnects QD is swiftly accomplished. As the shoulders 67 of the male plugs come to seat on the terminal rims 86 of their corresponding female plugs 51, 53, pin 79 depresses against its spring 81, to remove ledge 82 from the lock plate's slot's body formation 77, and the smallest body formation 78 (of slot 73) engages the thin stem 84 of pin 79. Biased spring 74 concurrently acts against finger tab 72 to cause lock plate 70 to slide in its T-slot 68 in a direction that places, FIG. 7, the body formation of the lock plate's hole 71 into the male plug's a groove 65 and out of alignment with the bores of the female plugs, thereby locking together the quick-disconnects QD, with all of its male and female parts united to form a flowing conduit.

To simultaneously disconnect the three (3) quick-disconnects QD, depressing of both finger tabs 72, to wards one another in view of their dispositions in block 58, is to once again align the holes 71 in the two (2) lock plates 70 with their corresponding female-plug bores, while the smallest body formation 78 disengages stem 85 and stem 85 aligning itself with the smaller body formation 77, and withdrawing all of the female plugs from their corresponding male plugs. The pin 79 is not able to fly out of its (not visible) bore by reason of the smaller body formation 77 of the slot 73 being held under its ledge 82.

To prevent an incorrect hook-up of lines or hoses to the cylinder's nipples, although in linear alignment with one another, the axis of the center hole in block 58 is closer to the axis of one of the two exteriorly disposed holes 59 than the other, thereby preventing a wrong-way hook-up of the lines or hoses to the upper housing 22 of receptacle 21. The same geometrical consideration is made with and for the disposition of the three collars 45 mounted on housing 22, so that an incorrect hook-up of all of the quick-disconnects QD can never occur.

By applying thumb and finger pressure to the two actuators 72 facing each other from the side ends 87 of block 58, against the bias of the springs 74, the edge of the slot 73 in each of the lock plates 70 unseats from its engagement with the pin 79 and thereby removes the edge of the hole 71 from its groove 65, thereby providing ease in unlocking not only each exteriorly disposed quick disconnect but the middle-disposed quick-disconnect as well, as the entire mechanism 57 releases itself from the three (3) male plugs 48, 49, 50.

It is to be noted, FIG. 3, that the locking mechanism is not illustrated in the centrally-disposed female plug 52, as the locking of the two exteriorly disposed QD's in block 58 locks in effect all three QD's in their joining together.

Returning to the illustrated receptacle 21, a tube 88, FIG. 2, within the receptacle, is securely threaded to the one nipple 44. An aperture 89 is suitably provided in the apertured plate 41 through which the tube 88 projects into the depth of bottom housing component 23.

The threaded nipple 43 in the top housing component 22 remains communicative with the receptacle's chamber 29 and through which vacuum via the line 55 is applied during operation of the invention. Thus, the one line 54 is operatively connected to the hollow rod 32 for transmitting oil to the engine or system, the line 55 provides for the pulling of vacuum (or venting, in some applications of the invention) into the chamber 29 during operation of the invention, and the line 56 is operatively connected to the hollow tube 88 for returning unfiltered oil into the receptacle's chamber 29.

The receptacle 21 is securely positioned within a void of the engine compartment 18, or other suitable location, by any suitable bracketing means, one kind being illustrated in FIG. 2. An L-shaped bracket 90 is bolted (not shown), say, to the wall of a fender well (not shown) of the vehicle 14. A scalloped seat 91 is suitably provided on its horizontally-oriented leg 92 for ease of setting the contoured bottom of the cylinder 21 or receptacle in place in its mounting to the bracket. A clip 93 having a finger 94, FIG. 2, sufficiently curved, is welded to the inner surface of the vertically-oriented leg 95 of the bracket 90, for grasping the bottom housing compartment 23 thereby holding in a firm position the receptacle or cylinder 21 during operation.

In operation, as oil flows into and through the nipple 44 and into the hollow tube 88, it flows through oil filter 30, thereby being filtered, and then flows through the spaced orifices 42 of the rod 32. The filtered oil thereafter flows up hollow rod 32, etc., and out through hose 54 to again lubricate the engine or system.

In the embodiment illustrated by FIG. 10, an oil pack 96 includes a receptacle 97 having a sealed chamber 98, preferably transparent, formed by an endless wall 99, and bottom and top closures 101, 102, respectively, an oil filter 103 suitably securely mounted upon and to a hollow tubular member 104 that in turn is suitably operatively connected through the bottom closure 101 to an outlet conduit 105. Closure members 106 are suitably mounted to the top and bottom of the oil filter 103, whereby oil flows to the filter directly from the chamber 98. One part of a quick-disconnect 107, of the kind described above, mounts to conduit 105 and its mating part to a line or hose 108, in an assembly adapted for connection to a system requiring lubrication, more fully described hereinafter. An inlet conduit 109 is suitably securely mounted to the bottom closure 101 of the receptacle 97, and communicates with a bore 110 extending throughout the thickness of the bottom closure 101 to communicate with the sealed chamber 98. One component of a quick-disconnect 111, of the kind described above, suitably mounts to conduit 109 while its mating part is mounted to a line or hose 112 in an assembly adapted for connection to a system requiring lubrication, more fully described hereinafter. A dipstick 113 for gauging the amount of oil 114 in the receptacle's chamber 98 is provided in a suitable manner through the top closure member 102 for the receptacle 97. A vacuum line conduit 115 is suitably mounted to the top closure member 102 for access to the receptacle's chamber 98. One part of a quick-disconnect 116, of the kind described above, suitably mounts to conduit 115 and its mating part mounts to a vacuum line 117 in an assembly for connection to a system requiring lubrication, more fully described hereinafter. A mechanical one-way check valve 119 is suitably mounted in line 112, to prevent a backflow, i.e., a reverse flow, of oil 114 when the engine is shut down. An electrical shut-off valve 120, with its leads 121, is suitably mounted in line 108 to prevent oil discharging from the oil pack when the engine is shut down.

The oil pack 96 is readily removed, with the used or exhausted oil therein, from its stationary position or location adjacent its system or engine, upon disconnecting the quick-disconnects 107, 111, 116, and releasing it from a bracket member, like or similar to bracket member 88, mounted in place within an engine's compartment, or other location, and thereafter introducing a replacement oil pack 96 with fresh or filtered oil, by reconnecting the respective and corresponding quick-disconnect QD's together, and securely mounting the assembly of oil pack and connected lines thereto to the bracket member.

An oil pack 126 suitable for use on stationary machinery is illustrated in the FIG. 14 embodiment. An oil pump 127 is suitably built into a receptacle 128 of the oil pack 126, it being disposed between a platform 129 suitably securely mounted within the receptacle 128 and a bottom closure member 130 for the receptacle 128, and to which member the pump 127 is suitably securely mounted. In effect, two (2) chambers 131t, 131b, in which oil is retained, are generated. Oil flows first into the bottom chamber 131b via an inlet conduit 132 suitably attached to a port 133 formed in closure member 130 of the oil pack 126. The platform 129 includes at least one port 134 through its thickness in order that oil flows from the bottom chamber 131b into the top chamber 131t and thence into a filter 135 suitably securely mounted to and on the platform 129 within the top chamber 131t. Oil flows through filter 135 in the same manner and direction as it does in filter 30. Oil filtered by filter 135 is drawn by pump 127 and to out of the pack 126 via its outlet conduit 136. Quick-disconnects 137, 138, of the kind described above, mount their corresponding plugs to conduits 132, 136, respectively, and with which, corresponding plugs mounted to the lines 112, 108, respectively, mate therewith, in an assembly adapted for connection to a system requiring lubrication, more fully described hereinafter. A vacuum line conduit 141 is suitably and operatively mounted to a top closure member 142 for communication to the receptacle 128. The mating parts of a quick-disconnect 143, of the kind described above, mount to conduit 141 and to a vacuum line 144 in an assembly for connection to a system requiring lubrication, more fully described hereinafter. The oil dipstick 113 again is suitably mounted to and through the closure member 142 to perform its customary function.

Figure 11:
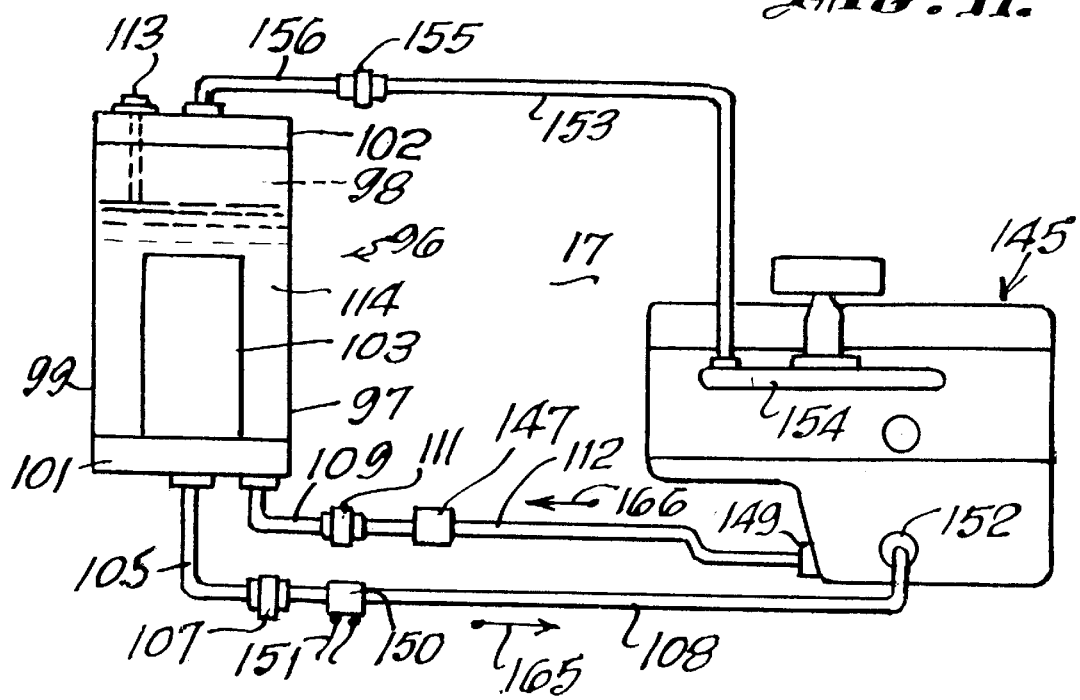
FIG. 11 is a schematic view of an oil pack and its arrangement with an assembly of lines as an embodiment of the invention and by which a system requiring lubrication is lubricated.

Turning now to FIGS. 11–14, for the purpose of illustrating the invention in the assemblies 17 of oil pack manufactures 16, 96, 126, and their corresponding combinations or arrangements with lines or hoses of the invention, the embodiment of FIG. 11 comprises an oil pack 96, with its filter 103 operatively mounted within its receptacle 97, mounted in operative connection to an oil-lubricated engine 145 by three (3) lines. The oil-flow line 112, including a one-way mechanical check valve 147 therein, so as to prevent backflow of oil in the line, is suitably connected between the engine's oil sump (as at 149), and the pack's inlet conduit 109 that communicates with chamber 98 of the receptacle 97, utilizing a quick-disconnect member 111 for operatively connecting together the conduit 109 with the oil-flow line 112. The oil-flow line 108 to engine 145 includes an electrical shut-off valve 150, having electrical leads 151 thereto, and closes when engine 145 is shut down. Valve 150 is suitably connected between the engine's oil pump (conventionally disposed within an engine's housing, behind the fitting or adaptor 152 on line 108 to its sump, and not visibly shown in FIG. 11) and the outlet conduit 105 that is operatively connected to the filter 103 of the oil pack 96, by means of the quick-disconnect member 107. A vacuum line 153, suitably connected at its one end to a manifold 154 of the engine 145, is operatively connected at its other end to a component of a quick-disconnect member 155 whose other component is operatively connected to a vacuum line conduit 156 securely mounted to the receptacle 97 and communicable with the chamber 98 of the oil pack 96. Line 153 may require an electrical shut-off valve (not shown) or a one-way check valve (not chown) to maintain vacuum after engine 145 is shut down, to assure full evacuation and return of the oil from the engine, however, such valves are not needed in every installation or assembly.

Figure 12:
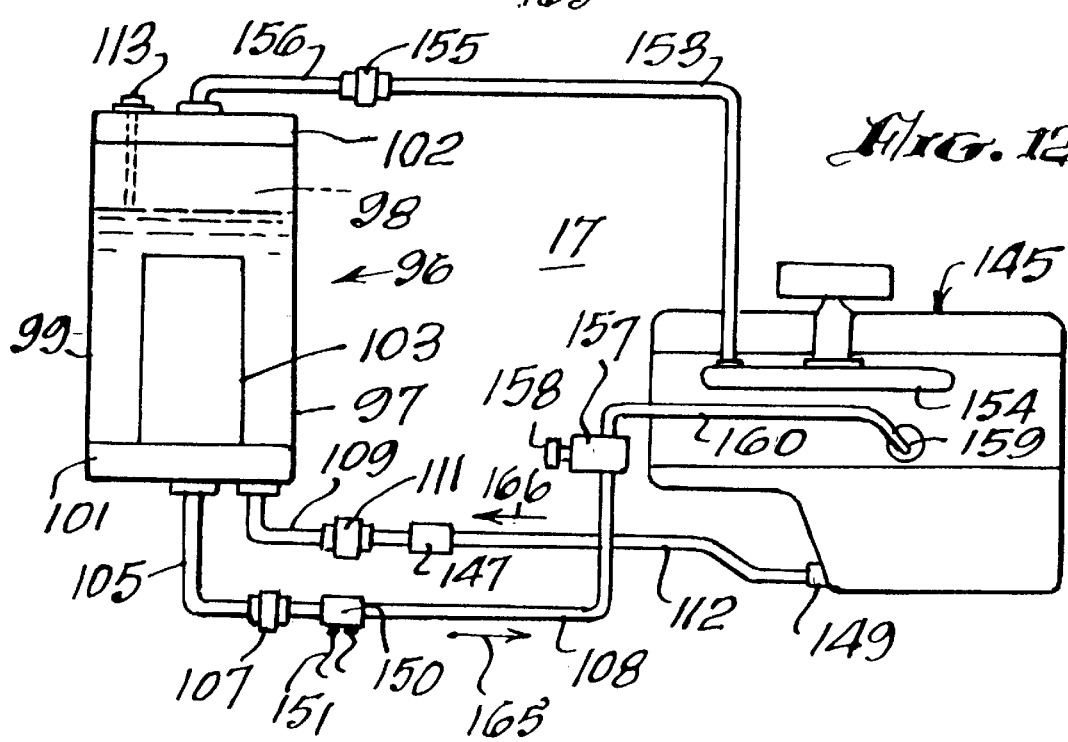
FIG. 12 is a schematic view of an oil pack and its arrangement with an assembly of lines as another embodiment of the invention and by which a system requiring lubrication is lubricated.

In the assembly illustrated in FIG. 12, an oil pump 157 is suitably mounted elsewhere than in the engine 145 proper (the engine's oil pump being plugged), its shaft being operated by a belt 158 suitably and operatively connected to a source of power (not shown) such as, for example, the engine's crank shaft. A suitable adaptor 159 replaces the opening in the engine at which a conventional oil filter otherwise would be mounted. An additional oil line 160 suitably connects adaptor 159 and oil pump 157 together. The oil-flow line 108 of FIG. 11 is suitably and operatively connected to the pump 157. Residual oil in the engine 145 or other system is pulled into oil pack 96 because of some vacuum remaining in line 153, conduit 156 and chamber 98.

In the assembly illustrated in FIG. 13, both oil lines, the return oil-flow line 112 to the oil pack 96 and the oil-flow line 108 from the pack 96 to the engine 145, are operatively connected to an oil pump 161 that operates off of the belt 158 or other motive power producing element. The one end of line 153 is suitably attached to the valve cover 163 where the engine 145 is, say, for example, a diesel. Also, conduit 156 can be vented directly to air rather than being connected to, through a line 153 extending to, cover 163.

In the assembly illustrated in FIG. 14, the apparatus 126, etc., described above in terms of an oil pack, is introduced into the assembly illustrated in FIG. 11, i.e., substituted in place of pack 96, however the oil flow line 108 to engine 145 is operatively connected to the engine at a point in its housing at which a conventional oil filter is mounted, as at 164. Again, the engine's internally disposed pump would be rendered inoperative, and plugged to prevent back flow.

In operation of each of the assemblies illustrated in FIGS. 11–14, as each engine 145 operates, its oil lubricating system functions in a usual manner, being supplied by oil emanating from a corresponding one of the oil packs 16 [FIG. 1], 96 [FIGS. 10–14], 126 [FIG. 14]. Oil flows through the corresponding oil-flow line in the corresponding assembly of oil pack and assembly of lines to the engine, its direction of flow shown by arrows 165, as a result of being pumped through the engine proper. The corresponding (vacuum/vent) lines 153, 144, in the engine's operation, provides the impetus for the oil to be withdrawn from the engine 145 by way of their corresponding line 112, the flow indicated by arrows 166, in which the oil returns to the chamber of the corresponding receptacle 97, 128 of the corresponding assembly. Thence the oil flows into and through a corresponding filter 103, 135, and thereafter, transmitted to the engine 145 via a corresponding conduit 105, 136 and a corresponding line 108 (the additional line 160 in the assembly of FIG. 12). The one-way check valve 147 and the shut-off valve 150 prevent oil flow in the wrong direction upon engine or system shut-down, in their corresponding conduits 108. Where an electrical valve 150 is utilized, electrical current is provided through associated electrical leads 151 that are operatively connected in known manner to an electrical source of suitable amperage and power.

When the life of the oil has become exhausted by reason of its use in the system, or for the need to change the oil based on a different reason, the oil is collected as a batch within the chamber of its oil pack. With engine turned off, virtually all the oil is in its oil pack. Thereafter, the three (3) quick disconnects QD of the assembly being used are manually disconnected, thereby providing ready removability for such oil pack from its bracket or other securing means which has maintained a firm stationary positioning for the assembly in which oil was returned to it and transmitted from its system during operation. A fresh oil pack, with the required batch of fresh, filtered, or reusable oil therein, its associated inlet and outlet conduits and its corresponding plugs of the corresponding three (3) disconnect QD's are introduced into the bracket/securing means location and securely mounted thereto, to maintain it in a firm stationary positioning. The male and female elements of the quick disconnects QD, from the oil pack and from the lines operatively connected to the engine 145, are joined together in a connected mode. The engine 145 is again ready for normal operation, with fresh, filtered, or reusable oil lubricating its moving parts. Energizing the engine automatically draws oil or liquid from the fresh oil pack.

In assembly of the subject matter of the embodiment of the invention illustrated in FIGS. 2–9, the hollow rod 32 and hollow tube 88 are threaded to the bored fitting 33 and necked collar 45, respectively, in the top housing component 22. The coiled spring 39 is mounted about hollow rod 32, as it seats on the fitting 33. The apertured plate 41 is mounted to the hollow rod 32, the tube 88 being thrust through the aperture 89 in plate 41. The oil filter 30 is mounted upon the hollow rod 32, preferably seating in a recess provided in plate 41, after which the apertured base member 35, members 37, 38, and bolt 36 are assembled to the oil filter 30 and hollow rod 32. In doing so, a compressive force is produced in the spring 38, exerted against the apertured plate 41, thereby maintaining the filter 30 firmly in its place. This sub-assembly then is mounted to the bottom housing component 23, after the gasket 26 has been circumferentially displaced about the lower lip 24. The Mormon clamp 28 is applied to both lips 24, 27, its lever or handle 281 with its other components being fastened about the housing components 21, 22 to seal off the chamber 29 of the receptacle 21.

The threaded nipples 34, 43, 44 are fastened to their corresponding collars 45 and thereafter, the male elements 48, 49, 50 of the quick-disconnect QD's are correspondingly suitably securely mounted thereto.

To mount and install each fabricated female plug 51, 53 to block 58, it is inserted through its respective hole in block 58, after which nuts 60 are tightened down on them from the top wall 61 of the block. Stop pin 79 with spring 81 in its pocket 82 is inserted into its bore formed in the recessed rim 80 of the plug. Its head 84 is depressed below the plane of the recessed rim 80, say by a pointed tool, after which lock plate 70 is caused to slide into its T-slot 68, its end adjacent slot 73 sliding over the head 84. Lock plate 70 continues to slide in T-slot 68, its spring 74 already being in place in its short bore 75, and as the smaller body formation 77 aligns itself with head 84, the head 84 snaps up within body formation 77 while lock plate 70 reverses its direction of sliding, the smallest formation 78 thence encompassing the pin's stem 85. As to female plug 52, application of a nut 60 thereto secures it in place in block 58. Hoses 54, 55, 56 can be suitably and securely mounted to the lengths of the female plugs in conventional manner, before or after installation of such plugs to block 58.

Receptacle 21 is made from metal, or from strong or transparent plastic for visible inspection or light-weightness. The oil inlet and return conduits are fabricated from metal or hose material. The lines are fabricated from hose material in known ways, or such as from rubber, fabric or synthetic materials, suitable for flexibility for disposition in spaces or voids between an oil pack and an engine or other system. The quick-disconnect QD's and their components or parts are commercially available and are attached in known manner to the inlet and return conduits and lines. Or a short length of line between such conduits and the attachments of the parts of the quick disconnects may be used. The mechanical and electrical one-way valves are known in the art, as are the oil filters and the oil pumps. If necessary, a vacuum regulator (not shown) is utilized in any one of the lines of the various embodiments connected to the vacuum line conduit 156, for obtaining a desired level of vacuum in the chamber of receptacle 21 of the oil pack, for an efficient operation of the assembly in relation to the system or engine to which it is coupled.

Various changes and modifications of and in the subject matter of the invention may be made without varying from the spirit or scope of the invention or of the appended claims. Mechanism 57 and/or the alignment of plugs and lines thereto need not be utilized, as each female plug 51, 52, 53 of the quick disconnects QD can be applied by itself to its corresponding male plug mounted on the receptacle 21 at a desired location, rather than as illustrated. The male plugs may be securely mounted in a metal panel that then is secured, such as by welding, to the top housing component 22. The oil filters may be mounted in different ways within their respective receptacles other than that illustrated. The collars 45 are threaded and then welded to the component 21, or to the noted metal panel, but may be threaded before or thereafter. The assembly of an oil pack and arrangement of lines is not necessarily limited to cooperative relationship with an oil lubricating system of an engine, but may be useful in other settings or systems as well. Tubular base 101 and bore 104, FIG. 10, where feasible, may be omitted in an embodiment of the invention.

Industrial Applicability

The invention is not limited in its application to an internal combustion engine 15, but also is applicable to any system or apparata having moving parts that require lubrication.

I claim:

1. A manufacture for filtering oil and adapted for supplying oil to lubricate an oil lubricating system comprising
    a receptacle having an endless wall and a sealed chamber in which a filtering means is adapted to be disposed,
    a top closure member mounted to said wall,
    a bottom closure member mounted to said wall,
    a platform mounted in said receptacle and spaced above said bottom closure member and having a platform bore therein,
    pump means mounted in said receptacle between said platform and bottom closure member,
    inlet conduit means mounted to said bottom closure and in communication with the space in the sealed chamber between said platform and bottom closure member,
    outlet conduit means mounted to said receptacle and operatively connected to said pump,
    means in said receptacle for mounting a filtering means to and above said platform and for connecting the filtering means to said pump means, third conduit means mounted to said receptacle for applying a vent or vacuum during operation of the manufacture,
    whereby upon such operation with a filtering means including a filter mounted in said receptacle, oil ingressing through said inlet conduit means flows into the space between said platform and bottom closure member and through said platform bore into the chamber above said platform and then into the filtering means to egress therefrom through said pump and outlet conduit means to the system.

2. The manufacture of claim 1 including
    a quick-disconnect coupling element connected to at least said inlet conduit means, or to at least said outlet conduit means, or to at least said third conduit means.

3. The manufacture of claim 1 including
    a quick-disconnect coupling element connected to at least two of the three conduit means.

4. The manufacture of claim 1 including
    a quick-disconnect coupling element connected to said inlet conduit means, to said outlet conduit means, and to said third conduit means.

* * * * *